Oct. 20, 1936.  M. F. JUDD  2,057,954

TOOTHED FRICTION FACING

Filed May 31, 1934

Inventor:
Morton F. Judd,
By: Lee J. Gary
Attorney

Patented Oct. 20, 1936

2,057,954

UNITED STATES PATENT OFFICE 2,057,954

TOOTHED FRICTION FACING

Morton F. Judd, Stratford, Conn., assignor to Raybestos-Manhattan, Inc., Passaic, N. J., a corporation of New Jersey Application May 31, 1934, Serial No. 728,259

8 Claims. (Cl. 154—52)

This invention relates to improvements in toothed friction facings adaptable for friction clutch use, the material of the facing being so treated as to render those portions strongest which are subjected to the greatest wear.

One form of toothed friction disk used in conjunction with friction clutches comprises non-metallic friction material in the shape of an annular ring, in the inner and/or outer peripheral edges of which integral teeth or splines are formed. This form of friction facing is fully described in my issued United States Patent No. 1,536,588, wherein its advantages are fully set forth.

The toothed friction facing described in my patent finds extensive use and gives excellent service in certain class of clutches. However, when such a facing is used on heavy duty clutches, the teeth or splines are subjected to excessive stresses which the material comprising the facing, teeth or splines, is unable to withstand.

As a feature of my present invention, I construct a splined friction facing of woven asbestos covered wire, suitably frictioned, impregnated and cut. The asbestos covered wire is initially woven into relatively thin sheets of cloth and the cloth is frictioned with a compound containing rubber mixed with inorganic materials. The layers of cloth thus frictioned are plied up and cured in a mold. Before plying the cloth and curing, the plies may be entirely saturated with a phenolic resin or those portions of the plies from which the splines are to be cut are so saturated. Thereafter, the cloth is plied, cured and cut. Clutch facings made in accordance with my invention possess materially greater strength and give longer service than similar clutch facings heretofore proposed.

Other objects and advantages of my invention will be apparent from the accompanying drawing and following detailed description.

In the drawing, Fig. 1 is a face view, parts being broken away, of a portion of a clutch ring embodying the concept of my invention.

Figure 1:
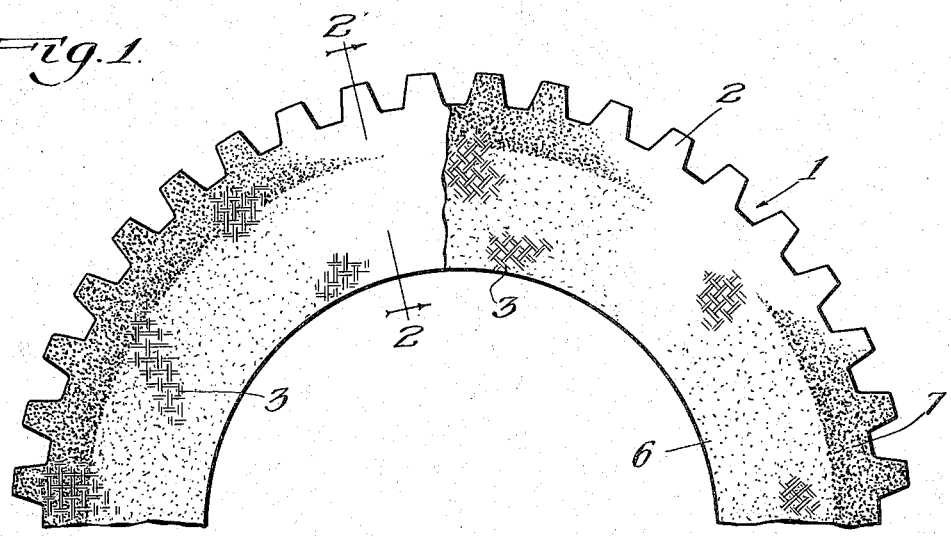
Figure 2:
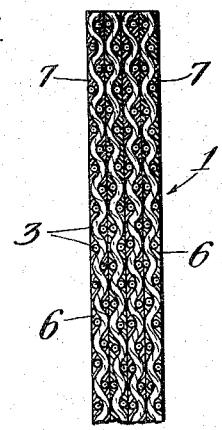
Fig. 2 is a sectional view taken on line 2—2 of Fig. 1.
Figure 3:
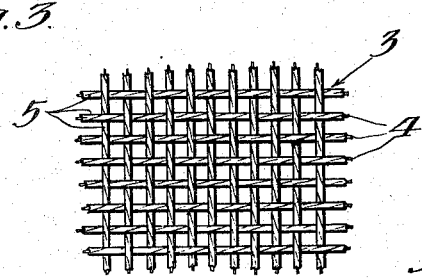
Fig. 3 is a face view of the woven asbestos covered wire cloth comprising a ply.

Referring in detail to the drawing, 1 indicates a portion of a friction facing which may be used in conjunction with a friction clutch of the type utilized in automobiles. The facing 1 may be of the annular ring type provided with integral teeth or splines 2 at its outer periphery. Of course, in the event that multiple facings are to be used in a clutch, the splines of some of the facings may be formed on the inner periphery of the facing.

The facing 1 may be of laminated or plied structure, each ply comprising a sheet of cloth 3 woven of wire 4, covered by asbestos or like fibrous material 5. The cloth 3 may be frictioned with a compound 6 comprising rubber mixed with inorganic materials. In addition the individual sheets 3 may be saturated with a synthetic resin 7, the entire area of the sheet being so saturated or only those portions thereof adjacent the periphery in which the splines 2 are subsequently formed.

After frictioning and impregnating the cloth 3, a series of layers thereof are plied to the desired thickness and cured in a mold under suitable heat and pressure. After curing the teeth or splines 2 may be cut in the usual manner.

In plying the sheets 3 the direction of the weave of adjacent plies may be disposed at an angle to each other or as referred to in the art, the plies may be arranged "fan-wise", reference being made to the direction of the weave. This, of course, imparts strength to the structure by reinforcing the weaker lines in the weaving.

A friction facing made in accordance with my invention may have, for a facing of predetermined dimensions, four to five times the tooth strength of the usual molded asbestos facings and in addition, by impregnating the plies with a synthetic resin or other plastic binder hardened by heat, such as, casein, phenolic and cresylic acids and the like, combined with various aldehydes and esters, the teeth or splines are not only made stronger but can be cut cleaner and more perfect.

It is apparent that I have provided a toothed friction facing which has maximum durability and tooth strength. The provision of the asbestos covered wire woven cloth contributes to the durability and strength not only by the presence of the wire but by the fact that the weave of the cloth of adjacent plies may be disposed "fan-wise". Moreover, the splines are additionally strengthened by the presence of a synthetic resin binder which also permits the cutting of more perfect splines.

I have tested the tooth strength on a $\frac{3}{16}$ inch facing of plied asbestos cloth with integral external teeth made according to the present invention and find the average strength of the teeth to be 215 pounds, with a minimum of 212 pounds and a maximum of 220 pounds. This is 1146 pounds per inch of tooth width and would permit a manufacturer to guarantee a tooth strength of 200 pounds per inch of width as compared with a guarantee of 50 pounds on the structure illustrated in my previous patent.

I claim as my invention:

1. A friction facing of the annular ring type having integral external or internal splines, comprising a plurality of sheets of previously frictioned asbestos covered wire cloth plied together and cured, those portions of the sheets adjacent the spline area containing a hardened synthetic resin.

2. A friction facing of the annular ring type having integral external or internal splines, comprising a plurality of woven sheets of previously frictioned asbestos covered wire cloth plied together and cured, those portions of the sheets adjacent the spline area also containing a hardened synthetic resin, the asbestos covered wire strands of said plies being disposed fan-wise with respect to the strands of adjacent plies.

3. A friction facing of the annular type having integral external or internal splines comprising a woven or braided fabric containing a friction augmenting agent and cured to provide a unitary structure, those portions of the structure adjacent the spline area containing a hardened binder additional to the aforesaid friction augmenting agent to reinforce the spline area whereby the splines have maximum structural strength and resistance to service stresses.

4. A friction facing of the annular ring type having integral external or internal splines comprising a plurality of sheets of woven or braided fabric containing a friction augmenting agent plied together and cured to provide a unitary structure, those portions of the structure adjacent the spline area containing a hardened binder additional to the aforesaid friction augmenting agent to reinforce the spline area whereby the splines have maximum structural strength and resistance to service stresses.

5. A friction facing of the annular ring type having integral external or internal splines, comprising a body including asbestos fiber treated with a friction augmenting agent, those portions of the structure adjacent the spline area containing a hardened binder additional to the aforesaid friction augmenting agent to reinforce the spline area whereby the splines have maximum structural strength and resistance to service stresses.

6. A friction element comprising a body of woven or braided asbestos fiber treated with a friction augmenting agent, a portion of said body containing a hardened binder additional to the aforesaid friction augmenting agent to increase the structural strength and resistance to service stresses of said portion.

7. A friction facing of the annular ring type having integral external or internal splines, comprising a plurality of woven sheets of asbestos covered wire cloth plied together and cured to provide a unitary structure, the asbestos covered wire strands of said plies being disposed in fan-wise arrangement with the strands of one ply disposed at an angle less than 90° to corresponding strands of adjacent plies.

8. In a method of producing a friction element that is composed mainly of woven or braided asbestos fibrous material treated with a friction augmenting agent, that step which consists in impregnating a selected area of said element with a hardening binder additional to the aforesaid friction augmenting agent to increase the structural strength and resistance to service stresses of said area.

MORTON F. JUDD.